(12) United States Patent
Mizell et al.

(10) Patent No.: US 7,420,951 B1
(45) Date of Patent: Sep. 2, 2008

(54) PACKET-SWITCHED COMMUNICATIONS IN A MOBILE NETWORK

(75) Inventors: Jerry L. Mizell, Plano, TX (US); Curtis M. Provost, Plano, TX (US); Martin L. J. Gallant, Garland, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 792 days.

(21) Appl. No.: 09/609,913

(22) Filed: Jul. 3, 2000

Related U.S. Application Data

(60) Provisional application No. 60/165,256, filed on Nov. 12, 1999, provisional application No. 60/165,246, filed on Nov. 12, 1999, provisional application No. 60/164,885, filed on Nov. 12, 1999, provisional application No. 60/165,364, filed on Nov. 12, 1999, provisional application No. 60/165,274, filed on Nov. 12, 1999.

(51) Int. Cl.
*H04Q 7/24* (2006.01)
(52) U.S. Cl. ................................. 370/338; 370/401
(58) Field of Classification Search ................. 370/328, 370/338, 401, 465, 466
See application file for complete search history.

(56) References Cited

U.S. PATENT DOCUMENTS

| | | | |
|---|---|---|---|
| 5,278,890 A | | 1/1994 | Beeson |
| 5,487,065 A | | 1/1996 | Acampora et al. |
| 5,815,495 A | * | 9/1998 | Saitoh et al. ................. 370/249 |
| 5,966,378 A | | 10/1999 | Hamalainen |
| 5,974,036 A | | 10/1999 | Acharya et al. |
| 6,167,040 A | | 12/2000 | Haeggstrom |
| 6,192,037 B1 | | 2/2001 | Spear |
| 6,233,458 B1 | | 5/2001 | Haumont |
| 6,317,421 B1 | | 11/2001 | Wilhelmsson et al. |
| 6,320,873 B1 | * | 11/2001 | Nevo et al. .................. 370/466 |
| 6,339,594 B1 | * | 1/2002 | Civanlar et al. ............. 370/352 |
| 6,359,877 B1 | | 3/2002 | Rathonyi et al. |
| 6,359,904 B1 | * | 3/2002 | Hamalainen et al. ........ 370/469 |
| 6,373,828 B1 | | 4/2002 | Stewart et al. |
| 6,374,117 B1 | | 4/2002 | Denkert et al. |
| 6,434,140 B1 | | 8/2002 | Barany et al. |
| 6,456,627 B1 | * | 9/2002 | Frodigh et al. .............. 370/465 |
| 6,469,994 B1 | | 10/2002 | Ueda |
| 6,480,476 B1 | | 11/2002 | Willars |

(Continued)

OTHER PUBLICATIONS

"Frame Relay Service in Today's Enterprise Network Environment", AT&T Frame Relay Service, The Technology Guide Series, 1998.

(Continued)

*Primary Examiner*—Chi H. Pham
*Assistant Examiner*—Christine Ng
(74) *Attorney, Agent, or Firm*—Trop, Pruner & Hu, P.C.

(57) ABSTRACT

A mobile communications system includes a system controller and cell sites having base station systems. The network between the system controller and the base station systems is a packet-switched network, such as an Internet Protocol (IP) network. In one embodiment, the mobile communications system is a General Packet Radio Service (GPRS) system. The system controller is a serving GPRS support node (SGSN), and the network between the SGSN and the base station systems includes a Gb network. In one arrangement, IP addressing is used to communicate messages between the base station systems and the SGSN.

16 Claims, 16 Drawing Sheets

U.S. PATENT DOCUMENTS

| | | | |
|---|---|---|---|
| 6,490,259 B1 | 12/2002 | Agrawal | |
| 6,505,047 B1* | 1/2003 | Palkisto | 455/456.1 |
| 6,512,756 B1* | 1/2003 | Mustajarvi et al. | 370/341 |
| 6,519,235 B1 | 2/2003 | Kim et al. | |
| 6,553,006 B1* | 4/2003 | Kalliokulju et al. | 370/310 |
| 6,574,668 B1 | 6/2003 | Gubbi et al. | |
| 6,584,098 B1* | 6/2003 | Dutnall | 370/354 |
| 6,603,738 B1 | 8/2003 | Kari et al. | |
| 6,606,501 B1 | 8/2003 | Saha et al. | |
| 6,608,832 B2 | 8/2003 | Forslow | |
| 6,628,617 B1* | 9/2003 | Karol et al. | 370/237 |
| 6,636,491 B1* | 10/2003 | Kari et al. | 370/328 |
| 6,647,264 B1 | 11/2003 | Sasamoto | |
| 6,687,226 B1* | 2/2004 | Galyas | 370/231 |
| 6,711,143 B1 | 3/2004 | Balazinski et al. | |
| 6,725,038 B1 | 4/2004 | Subbiah | |
| 6,728,247 B1 | 4/2004 | Meyer et al. | |
| 6,728,268 B1* | 4/2004 | Bird | 370/474 |
| 6,738,379 B1 | 5/2004 | Balazinski et al. | |
| 6,751,209 B1 | 6/2004 | Hamiti et al. | |
| 6,763,007 B1* | 7/2004 | La Porta et al. | 370/331 |
| 6,920,116 B1 | 7/2005 | Hossain et al. | |
| 7,042,855 B1 | 5/2006 | Gilchrist et al. | |
| 2001/0033563 A1 | 10/2001 | Niemela et al. | |
| 2001/0041575 A1* | 11/2001 | Amirijoo et al. | 455/456 |
| 2002/0048268 A1* | 4/2002 | Menon et al. | 370/349 |
| 2003/0039237 A1 | 2/2003 | Forslow | |

OTHER PUBLICATIONS

"Technology Overview—Frame Relay Technology", Obtained From http://www.adtran.com/tech_overview/fr_tech/index.htm, publication date unknown.

"Voice Over Frame Relay (VOFR) Tutorial", IEEE Communications Standards Information Service, Jun. 7, 1999.

S. Masud, "Still Your WAN Workhorse" Internetweek, Techweb News, CMP Media Inc., Dec. 22, 1997.

S. Deering, et al., Network Working Group, Request for Comments 2460, "Internet Protocol, Version 6 (IPv6) Specification," Dec. 1998, pp. 1-36.

J. Postel; Request for Comments 768, "User Datagram Protocol", Aug. 28, 1980, pp. 1-3.

Information Sciences Institute, Request for Comments 791, "Internet Protocol—DARPA Internet Program, Protocol Specification," Sep. 1981, pp. 1-48.

"Digital Cellular Telecommunications System (Phase 2+); General Packet Radio Service (GPRS); Base Station System (BSS)—Servicing GPRS Support Node (SGSN); BSS GPRS Protocol (BSSGP)", ETSI TS 101 343, V7.0.0 (Jul. 1999) , European Standards Institute, 1999.

Digital Cellular Telecommunications System (Phase 2+); General Packet Radio Service (GPRS); Service Description; Stage 2 (GSM 03.60 Version 7.1.0 Release 1988) ETSI EN 301 344 V7.1.0 (Aug. 1999) , European Standards Institute, 1999.

Digital Cellular Telecommunications System (Phase 2+); General Packet Radio Service (GPRS); Base Station System (BSS)—Servicing GPRS Support Node (SGSN) Interface; Network Service (GSM 08.16 Version 7.1.0 Release 1998) TS 101 299, V6.3.0 (Jul. 1999), European Standards Institute, 1999.

J.L. Mizell et al., U.S. Appl. No. 09/715,753, Entitled "Communicating Over One Or More Paths In An Interface Between A Base Station And A System Controller," filed Nov. 17, 2000, pp. 1-35, Figs. 1-19.

U.S. Appl. No. 09/715,758, filed Nov. 17, 2000, Office Action dated Mar. 25, 2004, pp. 1-9.

U.S. Appl. No. 09/715,758, filed Nov. 17, 2000, Office Action dated Dec. 14, 2004, pp. 1-13.

U.S. Appl. No. 09/715,758, filed Nov. 17, 2000, Office Action dated Jun. 30, 2005, pp. 1-9.

U.S. Appl. No. 09/715,758, filed Nov. 17, 2000, Office Action dated Oct. 5, 2005, pp. 1-11.

U.S. Appl. No. 09/715,758, filed Nov. 17, 2000, Office Action dated Apr. 5, 2006, pp. 1-13.

U.S. Appl. No. 09/715,758, filed Nov. 17, 2000, Office Action dated Jan. 11, 2007, pp. 1-13.

U.S. Appl. No. 09/715,758, filed Nov. 17, 2000, Office Action dated Jul. 11, 2007, pp. 1-20.

U.S. Appl. No. 09/715,753, filed Nov. 17, 2000, Office Action dated Apr. 16, 2004, pp. 1-19.

U.S. Appl. No. 09/715,753, filed Nov. 17, 2000, Office Action dated Dec. 16, 2004, pp. 1-10.

U.S. Appl. No. 09/715,753, filed Nov. 17, 2000, Office Action dated Mar. 29, 2005, pp. 1-14.

U.S. Appl. No. 09/715,753, filed Nov. 17, 2000, Notice of Allowance dated Sep. 12, 2005, pp. 1-6.

* cited by examiner

NS-BLOCK ⟵ 300

| INFORMATION ELEMENT | PRESENCE | FORMAT | LENGTH |
|---|---|---|---|
| PDU TYPE | M | V | 1 |
| CAUSE | M | TLV | 3 |
| NSEI | M | TLV | 4 |
| NS IP IP ADDRESS | M | TLV | 6-18 |
| NS IP IP ADDRESS | O | TLV | 6-18 |

302 — PDU TYPE
304 — CAUSE
306 — NSEI
308 — NS IP IP ADDRESS
310 — NS IP IP ADDRESS

FIG. 8A

NS-BLOCK-ACK ⟵ 320

| INFORMATION ELEMENT | PRESENCE | FORMAT | LENGTH |
|---|---|---|---|
| PDU TYPE | M | V | 1 |
| NS IP IP ADDRESS | M | TLV | 6-18 |
| NS IP IP ADDRESS | C | TLV | 6-18 |

322 — PDU TYPE
324 — NS IP IP ADDRESS
326 — NS IP IP ADDRESS

NS-PROV — 340

| INFORMATION ELEMENT | PRESENCE | FORMAT | LENGTH |
|---|---|---|---|
| PDU TYPE | M | V | 1 |
| CAUSE | M | TLV | 3 |
| NSEI | M | TLV | 4 |
| NS IP IP ADDRESS | M | TLV | 6-18 |
| NS IP IP ADDRESS | C | TLV | 6-18 |

NS-PROV-ACK — 360

| INFORMATION ELEMENT | PRESENCE | FORMAT | LENGTH |
|---|---|---|---|
| PDU TYPE | M | V | 1 |
| NSEI | M | TLV | 4 |
| NS IP IP ADDRESS | M | TLV | 6-18 |

NS-ALIVE

| INFORMATION ELEMENT | PRESENCE | FORMAT | LENGTH |
|---|---|---|---|
| PDU TYPE | M | V | 1 |

NS-ALIVE-ACK

| INFORMATION ELEMENT | PRESENCE | FORMAT | LENGTH |
|---|---|---|---|
| PDU TYPE | M | V | 1 |

NS-UNBLOCK 420

| INFORMATION ELEMENT | PRESENCE | FORMAT | LENGTH |
|---|---|---|---|
| PDU TYPE | M | V | 1 |
| NSEI | M | TLV | 4 |
| NS IP IP ADDRESS | M | TLV | 6-18 |
| NS IP IP ADDRESS | O | TLV | 6-18 |

422 — PDU TYPE
424 — NSEI
426 — NS IP IP ADDRESS
428 — NS IP IP ADDRESS

FIG. 11B

NS-UNBLOCK-ACK 440

| INFORMATION ELEMENT | PRESENCE | FORMAT | LENGTH |
|---|---|---|---|
| PDU TYPE | M | V | 1 |
| NSEI | M | TLV | 4 |
| NS IP IP ADDRESS | M | TLV | 6-18 |
| NS IP IP ADDRESS | C | TLV | 6-18 |

442 — PDU TYPE
444 — NSEI
446 — NS IP IP ADDRESS
448 — NS IP IP ADDRESS

FIG. 12

NS-UNITDATA 460

| INFORMATION ELEMENT | PRESENCE | FORMAT | LENGTH |
|---|---|---|---|
| PDU TYPE | M | V | 1 |
| SPARE OCTET | M | V | 1 |
| BVCI | M | V | 2 |
| NS-SDU | M | V | 1-? |

FIG. 13

NS-STATUS 480

| INFORMATION ELEMENT | PRESENCE | FORMAT | LENGTH |
|---|---|---|---|
| PDU TYPE | M | V | 1 |
| CAUSE | M | TLV | 3 |
| NSEI | M | TLV | 4 |
| NS IP IP ADDRESS | C | TLV | 6-18 |
| NS PDU | C | TLV | 3-? |
| BVCI | C | TLV | 4 |

FIG. 15

| INFORMATION ELEMENT | PRESENCE | FORMAT | LENGTH |
|---|---|---|---|
| PDU TYPE | M | V | 1 |
| BVCI | M | TLV | 4 |
| CAUSE | M | TLV | 3 |
| CELL IDENTIFIER | C | TLV | 10 |
| LA MULTICAST SUPPORT | O | TLV | 3 |
| RA MULTICAST SUPPORT | O | TLV | 3 |
| QOS PROFILE / UDP PORT | O | TLV | 5-? |
| VENDOR SPECIFIC IE | O | TLV | 3-? |

FIG. 16

| INFORMATION ELEMENT | PRESENCE | FORMAT | LENGTH |
|---|---|---|---|
| PDU TYPE | M | V | 1 |
| BVCI | M | TLV | 4 |
| CELL IDENTIFIER | C | TLV | 10 |
| LA MULTICAST ADDRESS | C | TLV | 6-18 |
| RA MULTICAST ADDRESS | C | TLV | 6-18 |
| VENDOR CODE | O | TLV | 4 |
| VENDOR SPECIFIC IE | O | TLV | 3-? |

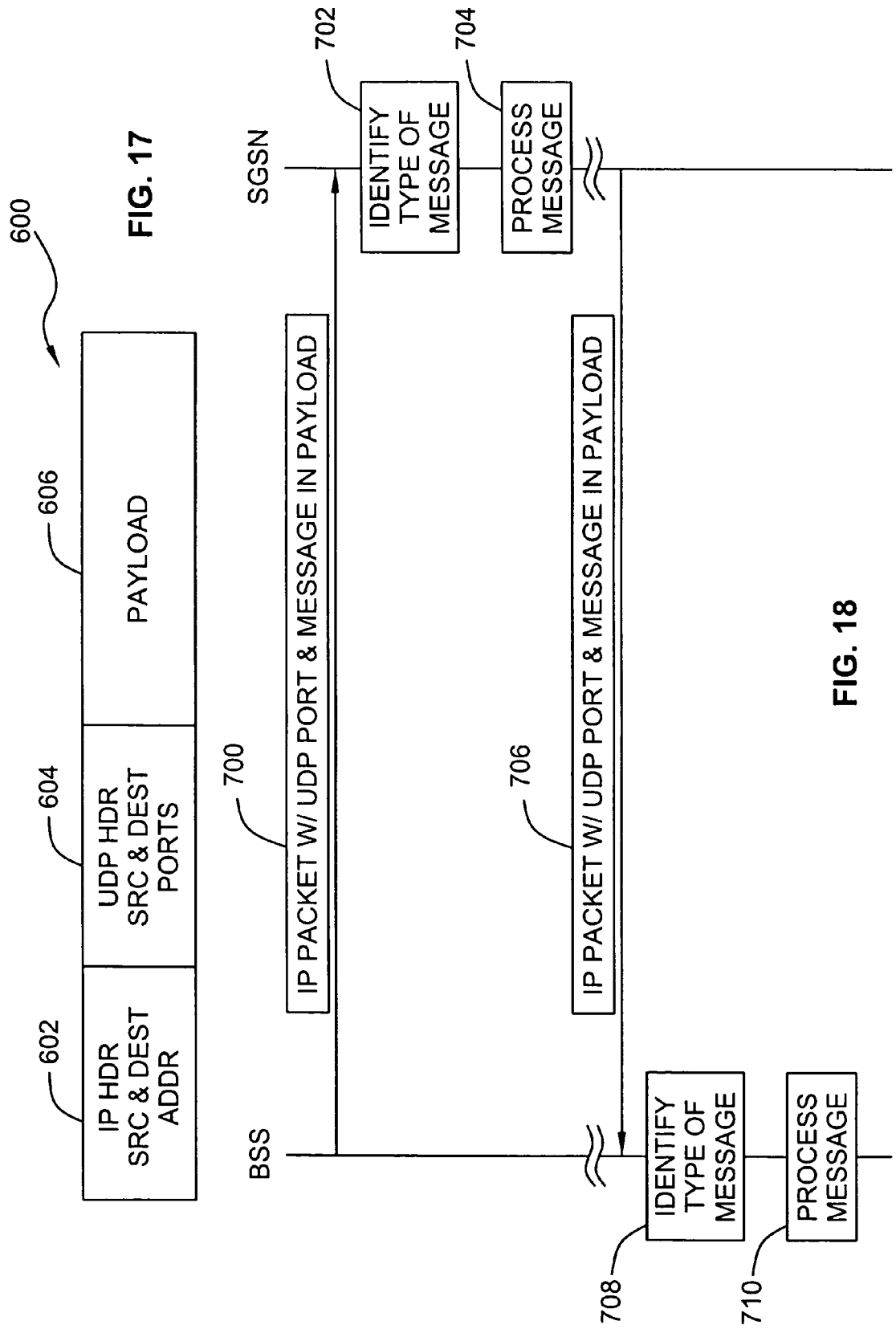

PACKET-SWITCHED COMMUNICATIONS IN A MOBILE NETWORK

This application claims priority under 35 U.S.C. § 119(e) to U.S. Provisional Application Ser. Nos. 60/165,256; 60/165,246; 60/164,885; 60/165,364; and 60/165,274, all filed Nov. 12, 1999.

BACKGROUND

The invention relates to packet-switched communications in mobile networks.

Mobile communications systems, such as cellular or personal communications services (PCS) systems, are made up of a plurality of cells. Each cell provides a radio communications center in which a mobile unit establishes a call with another mobile unit or a wireline unit connected to a public switched telephone network (PSTN). Each cell includes a radio base station, with each base station connected to a mobile switching center that controls processing of calls between or among mobile units or mobile units and PSTN units.

From the original advanced mobile phone system (AMPS) standard, additional wireless protocols have been developed and implemented. One such protocol is the time-division multiple access (TDMA) TIA/EIA-136 protocol from the Telecommunications Industry Association (TIA). With TIA/EIA-136 TDMA, each channel carries a frame that is divided into six time slots to support up to three or six mobile units per channel. Other TDMA-based systems include Global System for Mobile (GSM) communications systems, which use a TDMA frame divided into eight time slots (or burst periods).

Traditional speech-oriented wireless systems utilize circuit-switched connection paths in which a line is occupied for the duration of the connection between a mobile unit and the mobile switching center. Such a connection is optimum for communications that are relatively continuous, such as speech. However, data networks such as local area networks (LANs), wide area networks (WANs), and the Internet use packet-switched connections, in which communication between nodes on a communications link is performed with data packets. Each node occupies the communications link only for as long as the node needs to send or receive data packets. With the rapid increase in the number of cellular subscribers in conjunction with the rising popularity of communications over data networks, a packet-switched wireless data connection that provides access to the data networks, electronic mail, web sites, and other features has become increasingly desirable.

A wireless connection protocol that has been proposed to provide more efficient connections between a mobile unit and a packet-switched data network such as an Internet Protocol (IP) network is the General Packet Radio Service (GPRS) protocol, with versions complementing existing GSM systems and TIA/EIA-136 systems. In a GPRS communications system, various entities are present. A serving GPRS support node (SGSN) controls communications between mobile units and a packet-based data network. The SGSN is typically connected to a gateway GPRS support node (GGSN), which provides the interface to the packet-switched data network. The SGSN is connected to base station systems (BSS) over respective Gb interfaces, which provide for the exchange of control signaling and user data.

The Gb interface link layer may be based on the Frame Relay protocol, as described in TS 101 299, entitled "Digital Cellular Telecommunications System (Phase 2+); General Packet Radio Service (GPRS); Base Station System (BSS)-Serving GPRS Support Node (SGSN) Interface; Network Service," GSM 08.16 Version 6.1.0, Release 1997 (hereinafter the "GSM 08.16 Standard"). In a Frame Relay network, permanent virtual connections (PVCs) are established between the SGSN and each base station system. A PVC is a predetermined logical path through the network between two points, in this case the SGSN and a base station system. Each PVC is associated with a data link connection identifier (DLCI), which is the identification of the PVC used by the network to find the right path and destination for a communicated frame of data. A further description of the Gb interface is provided in Draft ETSI EN 301 344, entitled "Digital Cellular Telecommunications System (Phase 2+); General Packet Radio Service (GPRS); Service Description; Stage 2," GSM 03.60 Version 7.1.0, Release 1998 (hereinafter the "GSM 03.60 Standard").

Communications according to the Frame Relay protocol are connection-oriented, and differ from communications over connectionless, packet-switched networks such as IP networks. The Frame Relay protocol is relatively tightly coupled to the underlying physical layer, such as a T1 or T3 layer. This limits the flexibility in how the Gb interface can be implemented. A need thus exists for a more robust and flexible interface between base station systems and a system controller such as the SGSN in a mobile communications system.

SUMMARY

In general, according to one embodiment, a system for use in a mobile communications network having a plurality of cell sites comprises an interface adapted to communicate with a cell site over a network and a controller adapted to transmit and receive data through the interface over the network according to a packet-switched protocol.

Some embodiments of the invention may have one or more of the following advantages. By employing a packet-switched interface between a cell site and a system controller, flexibility is provided in deployment of mobile communication networks since packet-switched layers are not tightly coupled to an underlying physical or link layer. In addition, by using packet-switched interfaces, explicit virtual connections do not need to be established between a cell site and the system controller, which enhances flexibility in communications between the cell site and the system controller. Further, features offered by packet-switched interfaces enable enhanced and more efficient communications between the cell sites and the system controller.

Other features and advantages will become apparent from the following description, from the drawings, and from the claims.

BRIEF DESCRIPTION OF THE DRAWINGS

FIGS. 8A-8B, 9A-9B, 10A-10B, 11A-11B, 12, and 13 illustrate various IP-based Network Services ($NS^{IP}$) protocol data units (PDUs), in accordance with an embodiment.

FIGS. 15 and 16 illustrate Base Station System GPRS Protocol (BSSGP) Virtual Connection (BVC) messages, in accordance with an embodiment.

FIG. 17 illustrates an IP data packet for carrying one or more PDUs across the $Gb^{IP}$ network.

FIG. 18 is a message flow diagram showing exchanging and processing of IP packets directed at UDP (User Datagram Protocol) ports to distinguish different types of messages, in accordance with an embodiment.

DETAILED DESCRIPTION

Figure 1:
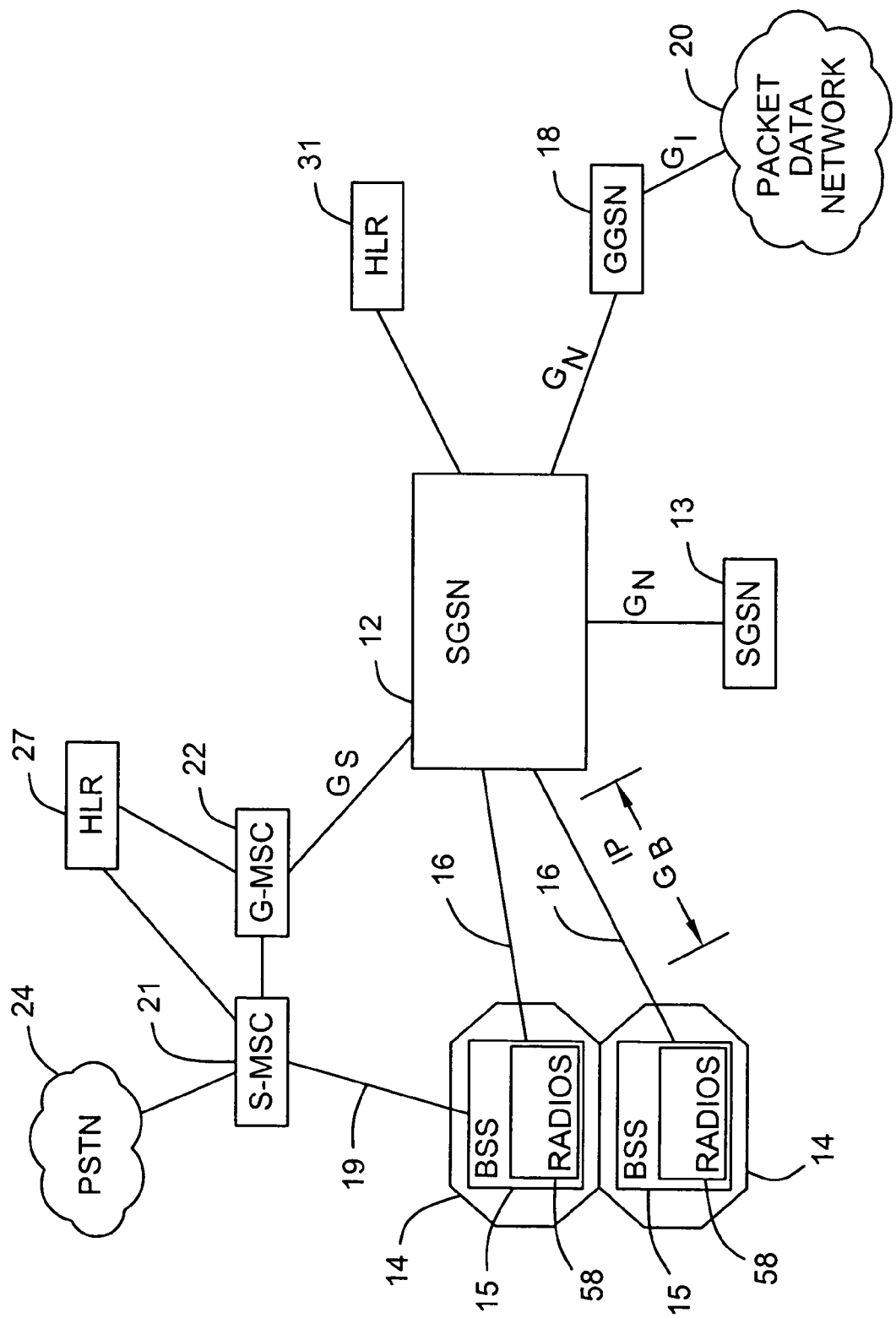
FIG. 1 is a block diagram of an embodiment of a mobile communications system.

In the following description, numerous details are set forth to provide an understanding of the present invention. However, it will be understood by those skilled in the art that the present invention may be practiced without these details and that numerous variations or modifications from the described embodiments may be possible. For example, although reference is made to Internet Protocol (IP) communications in some described embodiments, further embodiments may employ other forms of packet-switched communications. Further, although reference is made to the Gb interface between a BSS and a system controller, other types of interfaces between base stations and a system controller may be employed in further embodiments.

In accordance with some embodiments of the invention, the Frame Relay protocol used for communications over the Gb interface between a base station system (BSS) and a serving GPRS support node (SGSN) in a conventional General Packet Radio Service (GPRS) system is replaced with a packet-switched, connectionless protocol. An example of such a protocol is the Internet Protocol (IP), as described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. GPRS is a standard defined by ETSI (European Telecommunications Standards Institute). A version of the GPRS standard is described in the GSM 03.60 Standard. A Gb interface employing IP communications is referred to as a $Gb^{IP}$ interface. In further embodiments, $Gb^{IP}$ interfaces can be employed in Enhanced GPRS (EGPRS) systems and in EGPRS Compact systems.

Packet-switched networks such as IP networks communicate with packets, datagrams, or other units of data over the networks. Unlike circuit-switched networks, which provide a dedicated end-to-end connection or physical path for the duration of a call session, a packet-switched network is based on a connectionless internetwork layer. Packets or other units of data injected into a packet-switched data network may travel independently over any network (and possibly over different networks) to a destination point. The packets may even arrive out of order. Routing of the packets is based on one or more addresses carried in each packet.

Frame Relay networks differ from both dedicated, circuit-switched networks and packet-switched networks in that they are based on a virtual connection model. The virtual connection model is connection-oriented, with frames of data according to the Frame Relay protocol sent between two points over the same path (the virtual circuit) and arriving in the same order the packets were sent. Thus, even though the Frame Relay protocol is packet-based, it employs a connection-oriented model of communications that differ from packet-switched links, such as IP links, which are connectionless.

To implement a Gb interface with a packet-switched protocol, such as IP, transport and network layers are added. In addition, existing Frame Relay layers are modified to implement packet-switched services. One such layer is the Network Services (NS) layer. A main difference between the $Gb^{IP}$ and Gb interfaces is that addressing for the $Gb^{IP}$ interface is based on IP host addresses rather than virtual circuit endpoint identifiers. Thus, instead of maintaining virtual connections in the NS layer between network services entities in a base station system and the SGSN, the NS layer employs IP addresses to perform communications. An NS layer that employs IP addresses for communications, rather than NS-VCs (Network Service Virtual Connections), may be referred to as an $NS^{IP}$ layer. The concept of a virtual connection does not exist in the $NS^{IP}$ layer. Another distinction is that a conventional NS layer is responsible for managing physical links between the base station system and the SGSN across the Gb interface. In contrast, the $NS^{IP}$ layer is responsible only for directing traffic to IP addresses across the $Gb^{IP}$ link. As a result, the tight coupling between the NS layer and the underlying physical layer can be removed by use of the IP or other packet-switched interface.

Referring to FIG. 1, a communications system 10 includes an SGSN 12 that is coupled to base station systems (BSS) 15 at respective cell sites 14 through respective packet-switched networks 16. The SGSN 12 is part of a system controller for GPRS wireless services, EGPRS wireless services, or EGPRS Compact wireless services. The SGSN 12 is also coupled (through a Gn interface) to a gateway GPRS support node (GGSN) 18, which is coupled through a Gi interface to a data network 20, such as an IP network. Example data networks 20 include public networks, such as the Internet, and private networks, such as local area networks (LANs) and wide area networks (WANs). The SGSN 12 may also be coupled to one or more other SGSNs 13.

In the example arrangement of FIG. 1, the SGSN 12 is also coupled to a home location register (HLR) 31, which contains a database of subscriber information used to provide control in the GPRS network. The SGSN 12 may also be coupled to a gateway mobile switching center (G-MSC) 22, which is in turn coupled to a serving MSC (S-MSC) 21. The S-MSC 21 is part of the system controller for traditional circuit-switched mobile communications. The S-MSC 21 is coupled to cell sites 14 through corresponding links 19. The S-MSC 21 is also coupled to a public switched telephone network (PSTN) 24, which is coupled to wireline units such as wireline telephones. The S-MSC 21 and G-MSC 22 can access an HLR 27 that stores subscriber information for circuit-switched services. Other arrangements are possible in other embodiments.

In one embodiment, the network 16 includes a $Gb^{IP}$ network on which IP-addressable nodes reside, including the SGSN 12 and BSS 15 in corresponding cell sites. One or more IP routers may be present in the network 16.

Each BSS 15 according to one embodiment may include radio modules 58 including radio transceivers to provide radio frequency (RF) signals for communicating packet-switched control signaling and traffic with mobile stations (e.g., mobile telephones, portable computers, personal digital assistants) in the respective cell site. Optionally, the radio modules 58 may also include transceivers for communicating circuit-switched control signaling and traffic.

Figure 2:
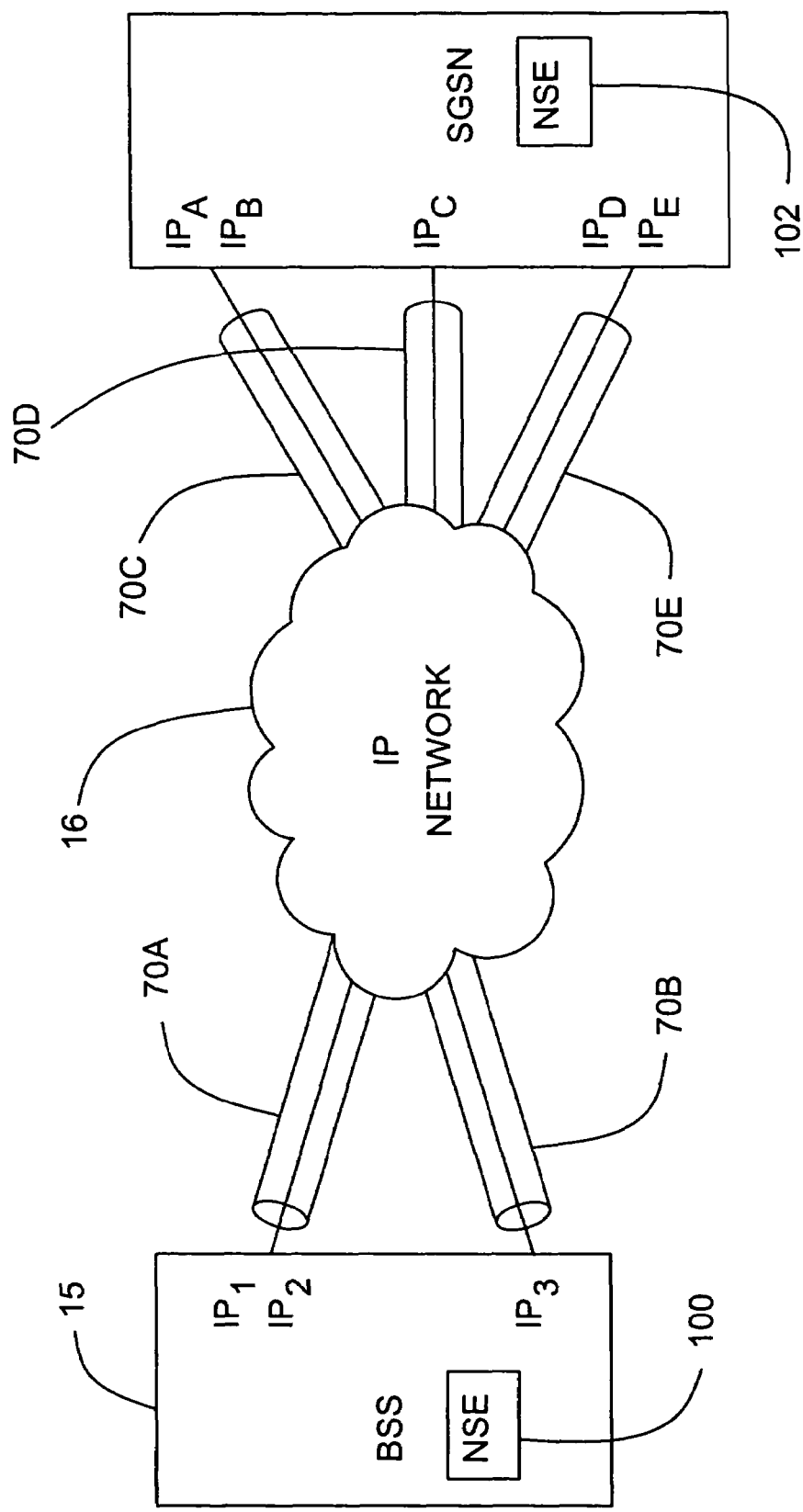
FIG. 2 illustrates an Internet Protocol (IP) address provisioning scheme for a base station system (BSS) and a serving GPRS support node (SGSN) in the mobile communications system of FIG. 1, in accordance with an embodiment.

Referring to FIG. 2, an IP addressing scheme is illustrated in the Gb$^{IP}$ network 16 that connects a base station system 15 and the SGSN 12. In provisioning the base station system 15, one or more IP addresses (e.g., $IP_1$, $IP_2$, $IP_3$, $IP_4$, and $IP_5$) may be assigned to the base station system 15. Multiple physical links 70A, 70B, 70C, 70D, and 70E are contained in the Gb$^{IP}$ network 16. Each link 70 may be a separate LAN, for example. In an alternative embodiment, the Gb$^{IP}$ interface may be implemented with a single physical link.

In provisioning the SGSN 12, plural IP addresses (e.g., $IP_a$, $IP_b$, $IP_c$, $IP_d$, and $IP_e$) may be assigned to the SGSN 12. In addition, one or more Network Service Entities (NSEs) 100 in the base station system 15 and one or more NSEs 102 in the SGSN 12 may each be assigned corresponding Network Service Entity Identifiers (NSEIs). The IP addresses assigned to each of the BSS 15 and the SGSN 12 are associated with respective NSEIs.

When sending uplink user traffic, the BSS selects the SGSN address. To limit out-of-order delivery, the BSS continues to send uplink traffic for any given mobile station to the same SGSN address. The SGSN records the link selector parameter (LSP) for the mobile station and starts a timer. The LSP is used to determine which destination IP address to direct a message. Until expiration of the timer, the SGSN 12 directs subsequent downlink traffic to the same BSS IP address. However, after expiration of the timer, the SGSN 12 directs subsequent downlink traffic to the primary IP address for the NSE 100 in the BSS 15. If the primary IP address is blocked, then the SGSN 12 directs downlink traffic to an alternate IP address. The SGSN 12 resets the timer upon receipt of each uplink PDU from the mobile station so that the timer does not expire while traffic continues to be communicated from the BSS to the SGSN from the given mobile station.

Figure 3:
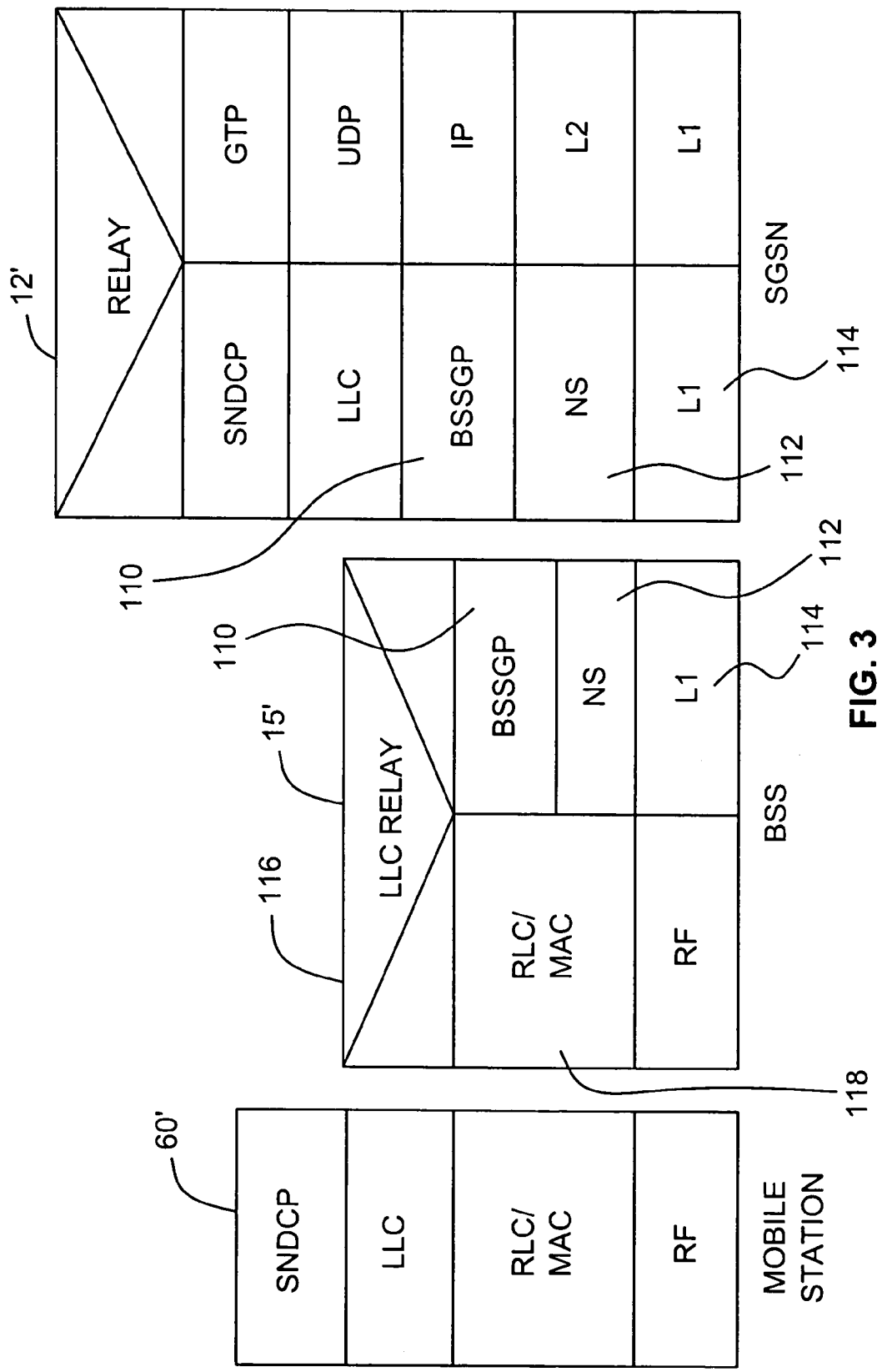
FIG. 3 illustrates interface layers in the user plane between a mobile station and the BSS and between the BSS and SGSN for a Gb interface employing a Frame Relay protocol.
Figure 4:
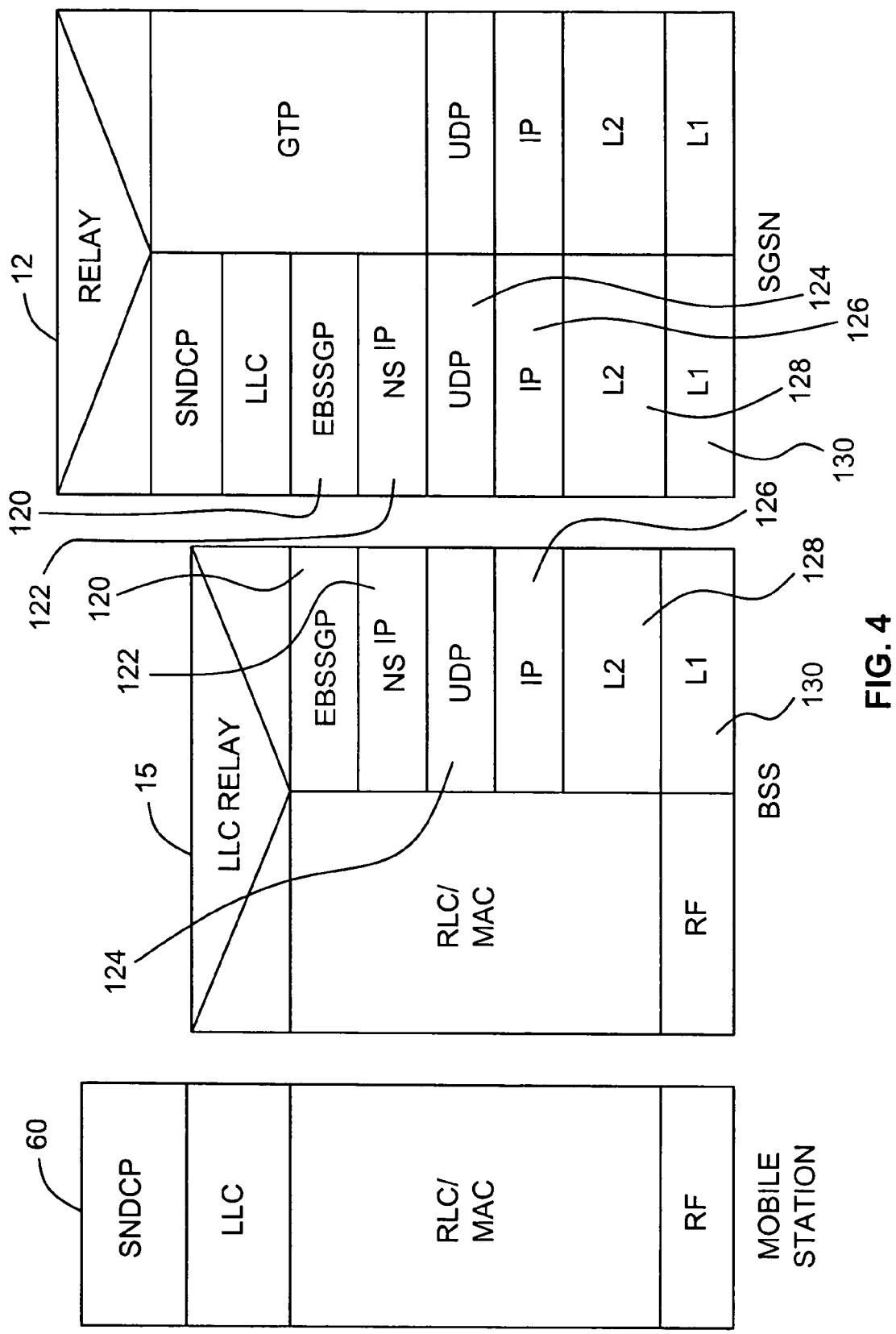
FIG. 4 illustrates interface layers in the user plane between a mobile station and the BSS and between the BSS and SGSN for an IP-based $Gb^{IP}$ interface, in accordance with an embodiment.

Referring to FIGS. 3 and 4, the differences between the Gb and Gb$^{IP}$ interfaces in the user plane (for communicating user or bearer traffic) are illustrated. FIG. 3 illustrates generally the interface between a mobile station 60' and a BSS 15' and the Gb interface between the BSS 15' and an SGSN 12' according to the Frame Relay protocol. FIG. 4 illustrates the interface between the mobile station 60 and the BSS 15 and the SGSN 12 and the Gb$^{IP}$ interface between the BSS 15 and the SGSN 12. Layers in the mobile station 60' (FIG. 3) are identical to the layers of the mobile station 60 (FIG. 4). However, some layers in the BSS 15' and SGSN 12' are different from those in the BSS 15 and SGSN 12 due to the differences in the Gb and Gb$^{IP}$ interfaces.

The Frame Relay-based Gb interface between the BSS 15' and the SGSN 12', as illustrated in FIG. 3, includes the BSSGP (Base Station System GPRS Protocol) layer 110, an NS (Network Services) layer 112, and an L1 layer 114 (e.g., a T1 link). The BSSGP layer 110 conveys routing and quality-of-service (QoS) related information between the BSS 15' and SGSN 12'. The NS layer transports BSSGP PDUs (protocol data units) across the Gb interface.

The BSS 15 also has a Relay layer 116 to provide buffering and parameter mapping between an RLC/MAC (radio link control/medium access control) layer 118 and the BSSGP layer 110. The RLC function provides a radio-solution-dependent reliable link, and the MAC function controls the access signaling (request and grant) procedures for the radio channel.

As shown in FIG. 4, to implement an IP-based Gb$^{IP}$ interface, the BSSGP layer 1110 (FIG. 3) has been enhanced to provide an EBSSGP layer 120. Many of the features of BSSGP remain the same, except that enhancements have been added to the EBSSGP layer for IP-based communications. Some added features that are supported by the EBSSGP layer 120 includes support for new message types, addition or modification of information elements in existing message types, and the addition of vendor-specific code and vendor specific information elements. In one embodiment, one feature that remains the same between the BSSGP and EBSSGP layers is that the concept of the BSSGP virtual connection (BVC) and the BVC identifier (BVCI) remains the same. The BVC is an end-to-end communications path between NS user entities, and the BVCI is the identifier of a BVC.

In the IP-based Gb$^{IP}$ interface shown in FIG. 4, the layers below the EBSSGP layer 120 include an NS$^{IP}$ layer 122, a UDP (User Datagram Protocol) layer 124, an IP layer 126, a level 2 (L2) layer 128, and a level 1 (L1) layer 130. The L1 layer 130 is the physical layer, and can include any number of physical circuits. Such physical circuits may include telephone lines, T1 or T3 lines, wireless links, and so forth. The L2 layer 128 may include a link layer such as a PTP (point-to-point) layer or an HDLC (high-level data link control) layer. UDP is a transport layer for managing connections between network elements over an IP network. UDP is described in RFC 768, entitled "User Datagram Protocol," dated August 1980.

Figure 5:
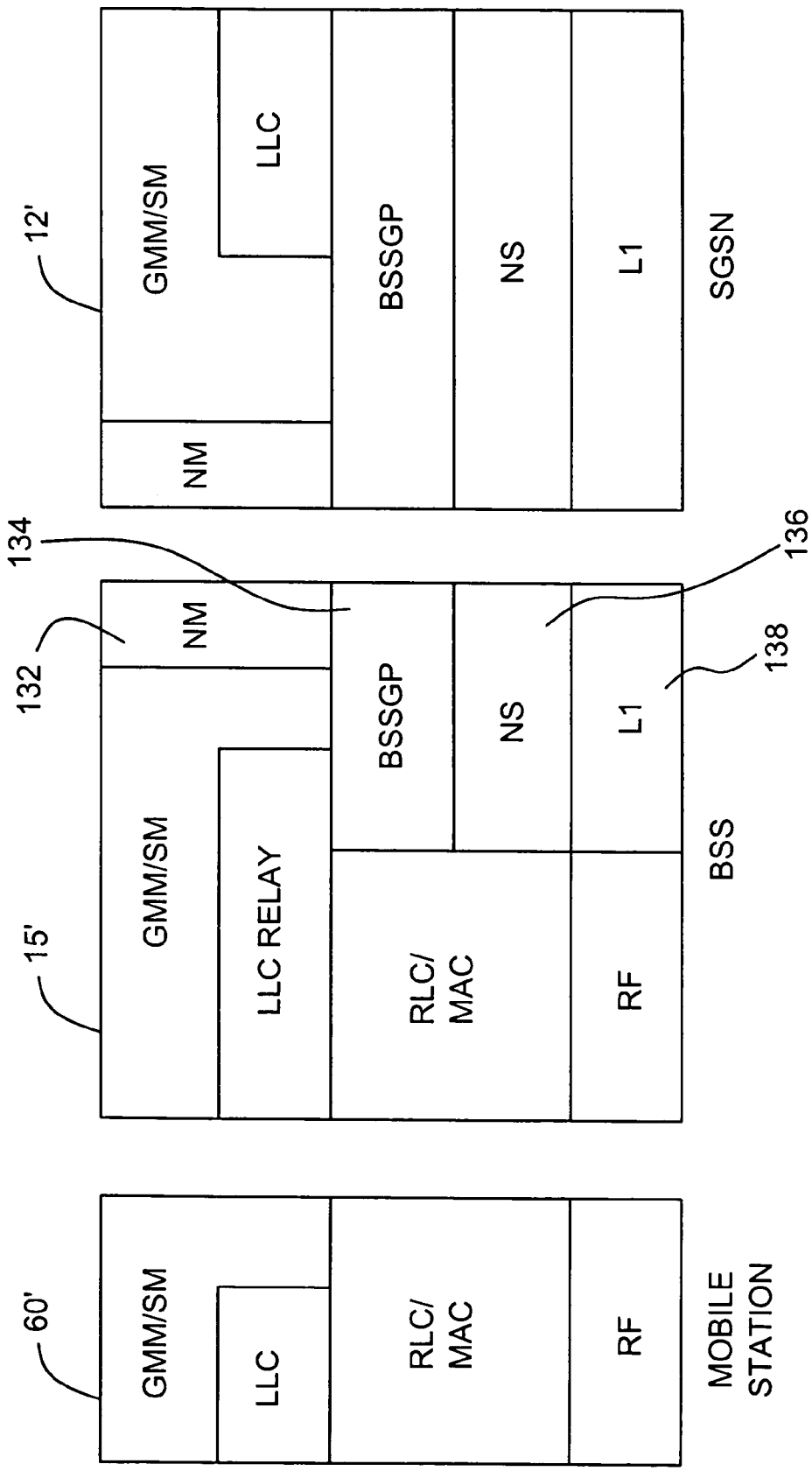
FIG. 5 illustrates control plane stack layers for a Gb interface employing a Frame Relay protocol.
Figure 6:
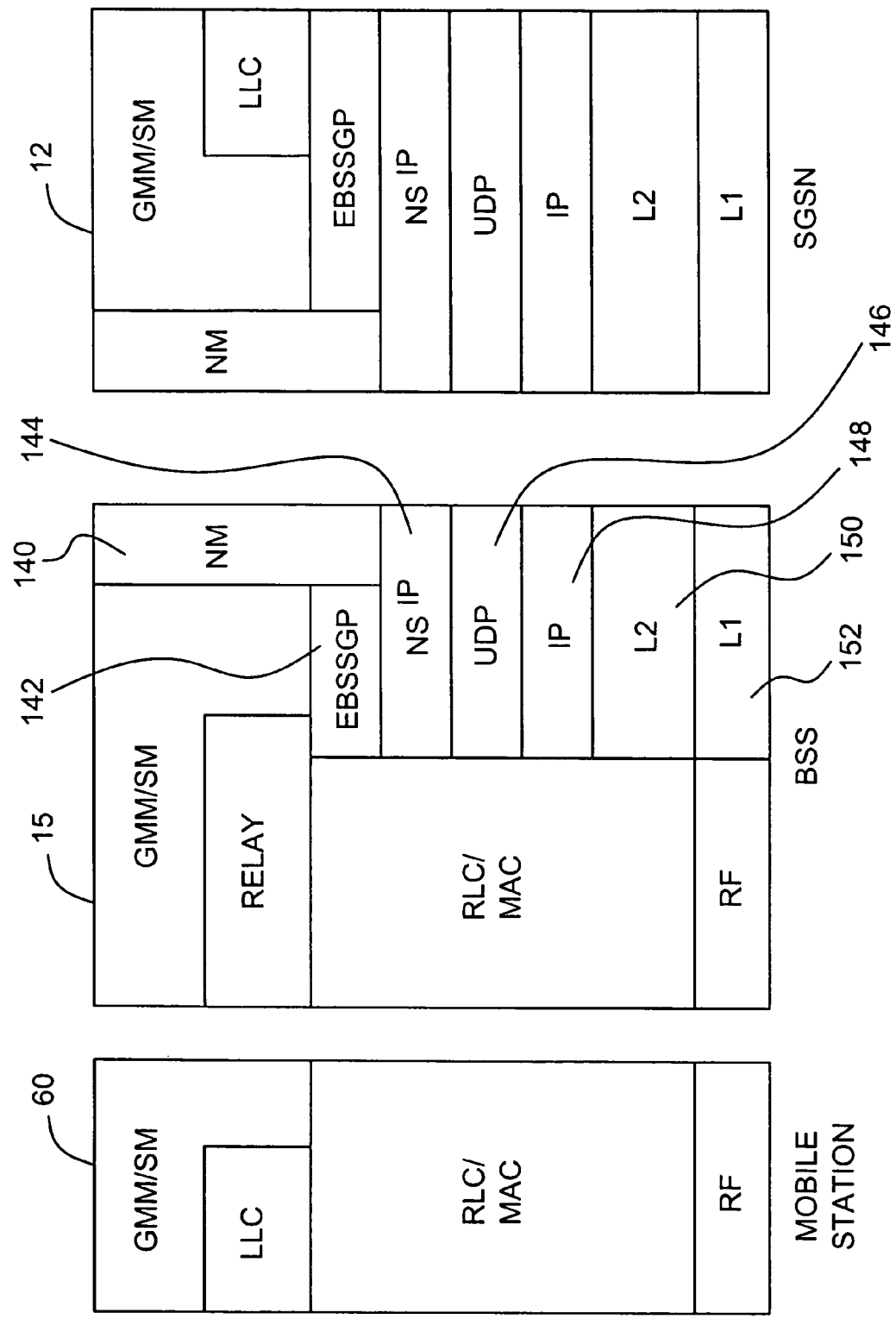
FIG. 6 illustrates control plane stack layers in an IP-based $Gb^{IP}$ interface, in accordance with an embodiment.

FIGS. 5 and 6 illustrate the Gb control stacks (in the control plane) for communicating control signaling according to the Frame Relay protocol and IP-based protocol, respectively. In the Frame Relay Gb interface of FIG. 5, the NM (network management) layer 132, BSSGP layer 134, NS layer 136, and L1 layer 138 form the Gb interface between the BSS 15' and the SGSN 12'. However, in the IP-based Gb interface of FIG. 6, the NM layer 140, EBSSGP layer 142, NS$^{IP}$ layer 144, UDP layer 146, IP layer 148, L2 layer 150, and L1 layer 152 form the Gb$^{IP}$ interface in the control plane between the BSS 15 and the SGSN 12. Thus, in the Gb$^{IP}$ control stack, the BSSGP layer 134 has been replaced with the EBSSGP layer 142, and the NS layer 136 has been replaced with the NS$^{IP}$ layer 144. In addition, the UDP, IP, and L2 layers 144, 146, and 148 have been added.

Figure 7:
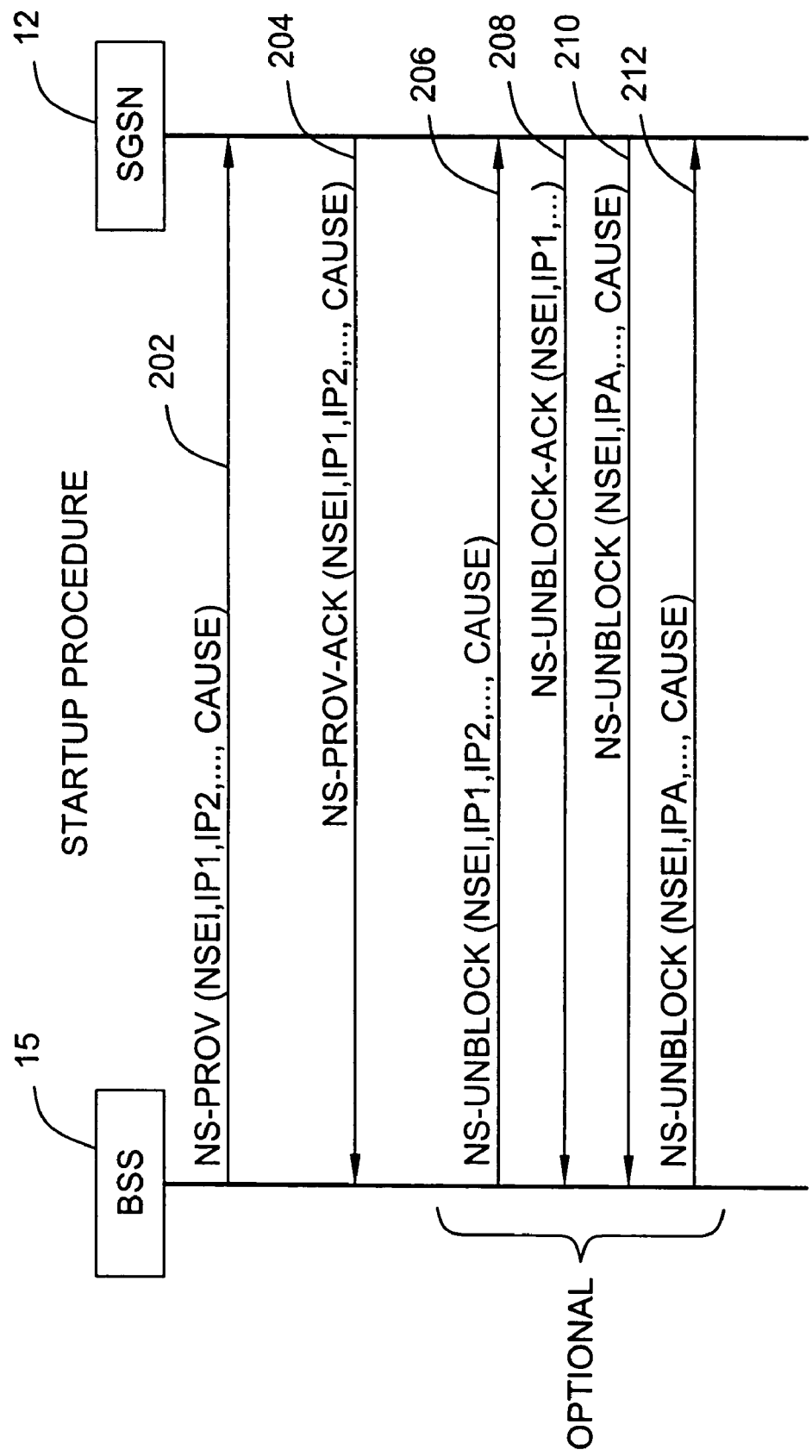
FIG. 7 is a message flow diagram of a startup procedure over the IP-based $Gb^{IP}$ interface, in accordance with an embodiment.

Referring to FIG. 7, the startup procedure, in accordance with one embodiment, between a BSS 15 and the SGSN 12 is illustrated. When starting up, the BSS 15 sends (at 202) an NS-PROV message or PDU (protocol data unit) to the SGSN 12 over the Gb$^{IP}$ interface. Communication of the NS-PROV message is controlled by the NSE 100 (FIG. 2) in the BSS 15. The NS-PROV message contains the NSE identifier (NSEI) and the IP addresses associated with the NSEI. The NS-PROV message also contains a "Cause" information element that specifies the reason for which a procedure (in this case the startup procedure) is triggered. Because the SGSN 12 is provisioned without knowledge of the IP address(es) of each BSS 15 in the system, communication of the NS-PROV message is employed to enable the SGSN 12 to dynamically detect the BSS IP addresses. However, because each BSS 15 is provisioned with knowledge of the SGSN IP addresses, communication of the NS-PROV message from the SGSN 12 is not needed in the illustrated embodiment.

In other embodiments, however, different provisioning schemes may be employed.

Upon receipt of the NS-PROV message, the SGSN 12 records the BSS IP addresses and marks them as alive and blocked. In accordance with one embodiment, the default procedure during startup is to block IP addresses at the recipient entity, in this case the SGSN 12. In a conventional Frame Relay Gb interface, when an NS-VC cannot be used for NS user traffic, it is blocked. When an NS-VC can be used for NS user traffic, it is unblocked. A similar concept is extended to the $Gb^{IP}$ interface, in which an IP address is noted as being blocked or unblocked. If blocked, the IP address cannot be used for NS user traffic. Aside from being the default state at startup, IP addresses may also be blocked for one of the following reasons: operation and maintenance intervention at the $Gb^{IP}$ interface making the IP address unavailable for NS user traffic; equipment failure at a BSS or the SGSN; failure in the transit network; or other causes.

In response to the NS-PROV message, the SGSN 12 sends (at 204) an NS-PROV-ACK message or PDU back to the BSS 15 that sent the NS-PROV message. The NS-PROV-ACK message contains the NSEI, IP addresses, and Cause information element included in the NS-PROV message from the BSS 15.

To unblock IP addresses so that they can be used to carry NS user traffic, the BSS 15 sends (at 206) an NS-UNBLOCK message or PDU to the SGSN 12. The NS-UNBLOCK message contains the NSEI of the BSS 15 as well as the IP addresses that are to be unblocked. In response to the NS-UNBLOCK message, the SGSN 12 returns (at 208) an NS-UNBLOCK-ACK message or PDU that contains the NSEI of the BSS 15 as well as associated IP addresses. In addition, the SGSN 12 can also unblock its IP addresses to enable communication of user traffic. It does so by sending an NS-UNBLOCK message (at 210) that contains the NSEI of the SGSN 12 and associated IP addresses. The BSS 15 returns with an NS-UNBLOCK-ACK message (at 212).

In addition to the startup procedure, other procedures between the BSS 15 and the SGSN 12 are similarly modified to employ IP addresses. For example, a test procedure may be started over the $Gb^{IP}$ interface that is used by the BSS 15 (or SGSN 12) to check the end-to-end communication with its peer entity (SGSN 12 or BSS 15) with respect to a given IP address. In the test procedure, the BSS 15 (or SGSN 12) sends an NS-ALIVE message or PDU on the IP address to be checked and starts a timer TNS-ALIVE and waits for an NS-ALIVE-ACK message PDU on the IP address from which the NS-ALIVE PDU was sent. Upon receipt of an NS-ALIVE PDU on an IP address, the SGSN 12 (or BSS 15) returns an NS-ALIVE-ACK PDU on the IP address from which the NS-ALIVE PDU was delivered. Upon receipt of the NS-ALIVE-ACK PDU in response to an NS-ALIVE PDU, confirmation is received that the end-to-end communication between the BSS 15 and the SGSN 12 is alive. The test procedure may be repeated for other IP addresses.

Referring to FIGS. 8A-8B, 9A-9B, 10A-10B, 11A-11B, 12, and 13, various $NS^{IP}$ messages or PDUs are illustrated that can be exchanged over a $Gb^{IP}$ interface. The $NS^{IP}$ PDUs have been modified to support IP addressing over the $Gb^{IP}$ interface. FIG. 8A shows the NS-BLOCK PDU 300, which contains several information elements, including a PDU-Type information element 302, a Cause information element 304, an NSEI information element 306, a first IP address 308, and additional one or more IP addresses 310. The PDU-Type information element 302 may have several different values to identify the different types of PDUs that may be used. Further, each information element may have the following three characteristics: presence, format, and length. Presence may have the value M (mandatory), C (conditional), or 0 (Optional). The format can be T (type), L (length), and V (value). In FIG. 8A, the information elements 302, 304, 306 and 308 are all marked as M, meaning that those information elements are mandatory in the NS-BLOCK PDU 300. The second and subsequent IP addresses 310 are optional elements.

An NS-BLOCK-ACK PDU 320 is illustrated in FIG. 8B, which contains the PDU-Type information element 322, a first IP address information element 324, and subsequent IP addresses 326. The PDU-Type and first IP address information elements 322 and 324 are marked as being mandatory, while subsequent IP addresses 326 are conditional. Subsequent IP addresses are contained in the NS-BLOCK-ACK PDU 320 only if multiple IP addresses were contained in the NS-BLOCK PDU 300.

Referring to FIGS. 9A-9B, the NS-PROV and NS-PROV-ACK PDUs 340 and 360, respectively, are illustrated. The NS-PROV PDU 340 contains the following information elements: PDU-Type 342, Cause 344, NSEI 346, first IP address 348, and subsequent one or more IP addresses 350. All information elements are mandatory except the second and subsequent IP addresses 350, which are marked conditional (C). The subsequent IP addresses 350 are contained in the NS-PROV PDU if the BSS 15 has assigned more than IP address.

As shown in FIG. 9B, the NS-PROV-ACK PDU 360 has three information elements: PDU-Type 362, NSEI 364, and IP address 366. All three information elements 362, 364, and 366 are marked mandatory.

Referring to FIGS. 1A-10B, NS-ALIVE and NS-ALIVE-ACK PDUs 380 and 400, respectively, are illustrated. The NS-ALIVE message 380 contains a PDU-Type information element 382, while the NS-ALIVE-ACK message 400 contains the PDU-Type information element 402.

Referring to FIGS. 11A-11B, another $NS^{IP}$ PDU is the NS-UNBLOCK PDU 420 to unblock one or more IP addresses. The NS-UNBLOCK message 420 contains the following information elements: PDU-Type (mandatory) 422, NSEI 424 (mandatory), first IP address 426 (mandatory), and subsequent one or more IP addresses 428 (optional).

The acknowledge message for NS-UNBLOCK is the NS-UNBLOCK-ACK PDU 440, as shown in FIG. 11B, which acknowledges that the IP addresses associated with the sender of the NS-UNBLOCK PDU have been marked unblocked. The information elements contained in the NS-UNBLOCK-ACK PDU 440 includes the following: PDU-Type 442 (mandatory), NSEI 444 (mandatory), first IP address 446 (mandatory), and subsequent one or more IP addresses 448 (conditional).

Referring to FIG. 12, an NS-UNITDATA PDU is used to transfer one NS-SDU between the BSS 15 and the SGSN 12. The NS-UNITDATA 460 contains the following information elements: PDU-Type 462 (mandatory), a spare octet 464 (mandatory); BVCI 466 (mandatory); and NS-SDU 468 (mandatory).

Another PDU exchanged between the BSS 15 and the SGSN 12 includes the NS-STATUS PDU 480, which is used to report error conditions. The NS-STATUS PDU 480 contains the following information elements: PDU-Type 482 (mandatory); Cause 484 (mandatory); NSEI 486 (mandatory); IP address 488 (conditional); NS-PDU (conditional); and BVCI 492 (conditional). The IP address information element 488 is contained in the NS-STATUS PDU 480 if the Cause information element 484 indicates that the IP address is blocked or the IP address is unknown. The NS-PDU information element 490 is included in the NS-STATUS PDU 480 if the NS-STATUS message is sent in response to a received NS PDU in which an error was detected, as indicated by the Cause information element 484. The BVCI information element 492 is included in the NS-STATUS PDU 480 if the BVCI was indicated by the Cause information element 484 as being unknown.

In addition to flexibility in implementing the Gb interface between the BSS 15 and the SGSN 12, a further benefit of using IP addressing is the ability to communicate by IP multicast. An IP multicast protocol is described in RFC 1301, entitled "Multicast Transport Protocol," dated February 1992. IP multicast may be used for signaling to multiple endpoints. A mobile station may be in one of three mobility management (MM) states: GPRS IDLE, STANDBY, and READY. In the GPRS IDLE state, the subscriber is not attached to GPRS mobility management. As a result, the mobile station and SGSN contexts do not hold valid location or routing information for the subscriber. In the STANDBY and READY states, the subscriber is attached to GPRS mobility management. In the READY state, the subscriber has radio link resources allocated, but in the STANDBY state, radio link resources have not been allocated to the subscriber.

To alert the mobile station when it is in the STANDBY state, a page to the mobile station may be performed. The mobile station may be paged in multiple cells or routing areas. In a conventional Frame Relay Gb interface, individual page messages are sent by the SGSN 12' to multiple cell sites in a given routing area. With a relatively large number of cells, the overhead required to generate and send multiple page messages (one to each cell) can be substantial. Bandwidth can be lost because of the presence of the large number of page messages in the system.

Figure 14:
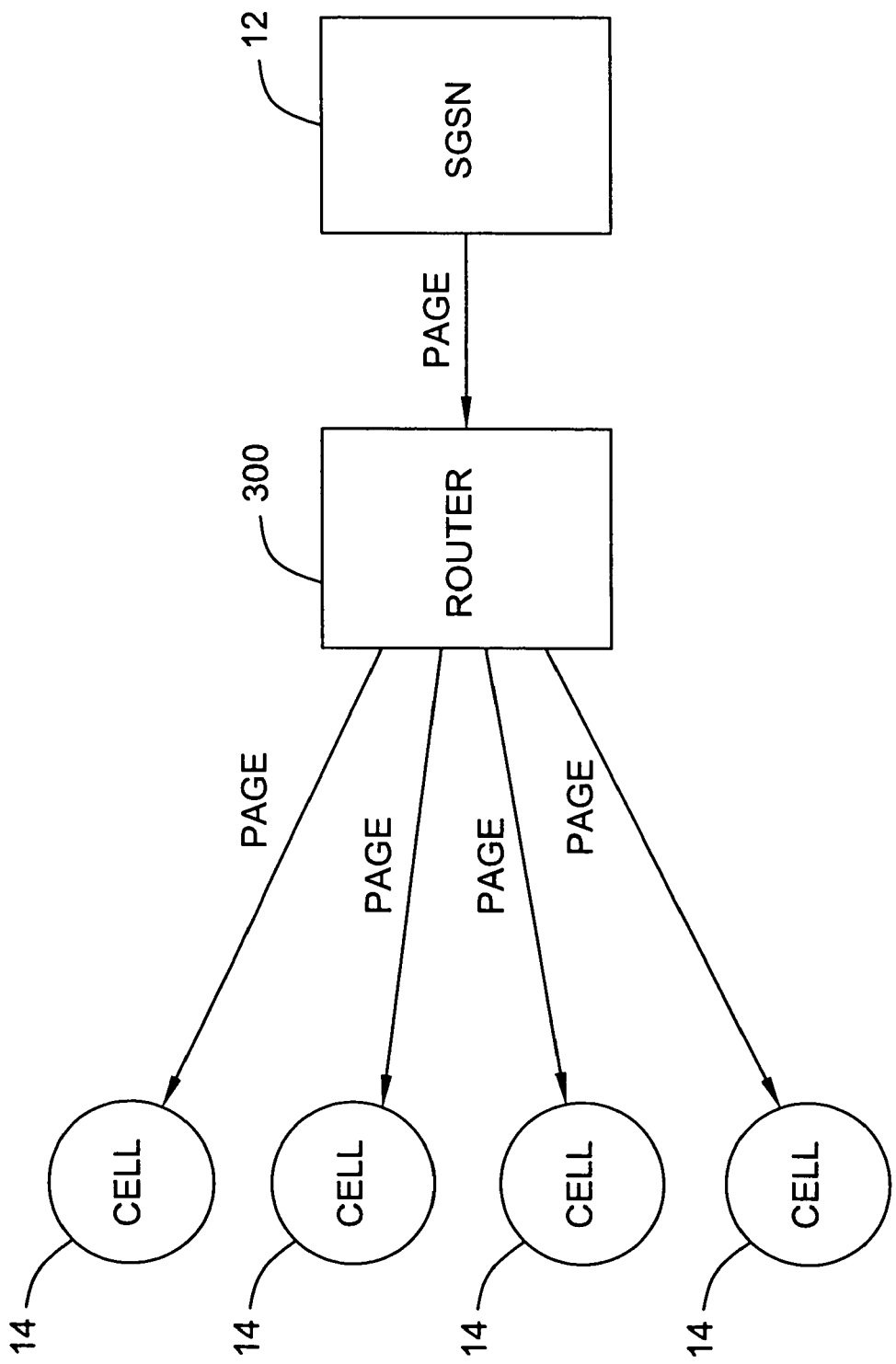
FIG. 14 illustrates paging using IP multicast in accordance with an embodiment in the mobile communications system of FIG. 1.

Referring to FIG. 14, instead of sending multiple pages to individual cells in a given routing area, the SGSN 12 may send a single page message to an IP router 300, specifying the IP multicast address of the desired routing area. The IP router 300 then performs an IP multicast using standard IP mechanisms of the page message to the cell sites 14 in the corresponding routing area. The IP router 300 is part of the packet-switched $Gb^{IP}$ network 16.

Each cell site may report the multicast address for a routing area. In the IP-based Gb interface, each cell entity (BSS) is addressed as an IP host. Each of the cell entities may register with routers in the Gb interface to identify itself as a member of a multicast group (a routing area or location area). A routing area includes a defined group of cell sites. In addition, a routing area is a subset of an entire location area. Using this scheme, the SGSN 12 has fewer messages to send to page a mobile station, which increases the capacity of the network and increases the efficiency of paging.

To enable the multicast capability, EBSSGP messages or PDUs have added information elements. One such message is the BVC-RESET PDU 500 for PTP-BVC, as illustrated in FIG. 15.

The purpose of the BVC-RESET procedure is to synchronize the initialization of BVC-related contexts at each BSS 15 and the SGSN 12. This enables the BSS and SGSN to begin communication in known states. A BVC-RESET procedure is performed because of recovery procedures related to a system failure in the SGSN or BSS that affects BVC functionality; an underlying network service system failure; or a change in the transmission capability of the underlying network service, where the "change" is from zero kbps to greater-than-zero kbps.

As shown in FIG. 15, the BVC-RESET PDU 500 contains the following information elements: PDU-Type 502, BVCI 504, Cause 506, Cell Identifier 508, LA Multicast Support 510, RA Multicast Support 512, QoS Profile/UDP Port 514, and Vendor Specific 516. The LA and RA Multicast Support information elements 510 and 512 (which can be set to TRUE or FALSE states) are included by the BSS 15 in the BVC-RESET PDU 500 to inform the SGSN 12 that the BSS can support paging via IP multicast. The LA Multicast Support information element 510 is used to indicate support for IP multicast paging to a location area, and the RA Multicast Support information element 512 is used to indicate support for IP multicast paging to a routing area.

Referring to FIG. 16, the BVC-RESET-ACK PDU 520 is the acknowledge message to the BVC-RESET PDU 500. The BVC-RESET-ACK PDU 520 contains the following information elements: PDU-Type 522, BVCI 524, Cell Identifier 526, LA Multicast Address 528, RA Multicast Address 530, Vendor Code 530, and Vendor Specific 534. If LA multicast support is indicated by the information element 510 in the BVC-RESET PDU 500, then the LA Multicast Address information element 528 sent by the SGSN 12 contains the LA multicast address. Similarly, if RA multicast support is indicated by the information element 512 in the BVC-RESET PDU 500, then the RA Multicast Address information element 530 contains the RA multicast address.

In the Cause information element 506 of the BVC-RESET PDU 500, two new values may be specified: Multicast Registration Failed and Multicast Registration Successful. After receiving the BVC-RESET-ACK PDU 520 from the SGSN 12, the BSS 15 registers the received LA or RA multicast address. If the registration fails, then the BSS 15 resends the BVC-RESET PDU 500 with the LA and RA Multicast Support information elements 510 and 512 set to FALSE and the Cause element 506 set to the Multicast Registration Failed value. The BSS 15, however, may continue to attempt registration of the multicast address; if successful, the BSS 15 may then send a new BVC-RESET message with the LA and RA Multicast Support flags 510 and 512 set to TRUE and the Cause element 506 set to the Multicast Registration Successful value.

Another aspect of the $Gb^{IP}$ interface is that UDP ports may be employed to identify different types of signaling and data. Referring to FIG. 17, an IP packet 600 that can be communicated across the $Gb^{IP}$ network between a BSS 15 and the SGSN 12 contains an IP header 602, a UDP header 604, and a payload section 606. The IP header 602 contains a source IP address and a destination IP address. The UDP header 604 contains a source UDP port and a destination UDP port. The payload section 606 carries the various types of signaling and data that can be exchanged over the $Gb^{IP}$ interface.

In accordance with some embodiments of the invention, the UDP port can be employed to distinguish between or among different types of signaling or data exchanged across the $Gb^{IP}$ network. Thus, for example, one port may be used for the signaling BVC, another port may be used for PTP signaling, and yet another port may be used for PTP bearer data. In addition, additional ports may be provisioned to provide QoS differentiation. If several commonly owned QoS profiles are to be used, the QoS profiles may be associated with separate UDP ports such that all bearer traffic with a predefined profile will be directed to the pre-allocated UDP port.

Using discrete ports for identifying traffic types allows for a flexible, configurable interface without requiring changes to the protocols. In other words, only the software application needs to change to classify a type of traffic by sending it to a particular UDP port.

Referring to FIG. 18, a BSS 15 sends an IP packet 700 that contains a first UDP port and a message payload. Upon receipt of the IP packet 700, the IP and UDP layers of the $Gb^{IP}$ interface are used to parse the packet. The UDP port information is determined to identify (at 702) the type of the message carried in the payload section of the IP packet 700. The message, which may be control signaling or bearer traffic data, is then processed (at 704) by the SGSN 12.

Similarly, the SGSN 12 can send an IP packet (at 706) containing a second UDP port and a message payload to the BSS 15. The BSS 15 identifies (at 708) the message type by parsing the UDP port. The message is then processed (at 710) in the BSS 15.

Figure 19:
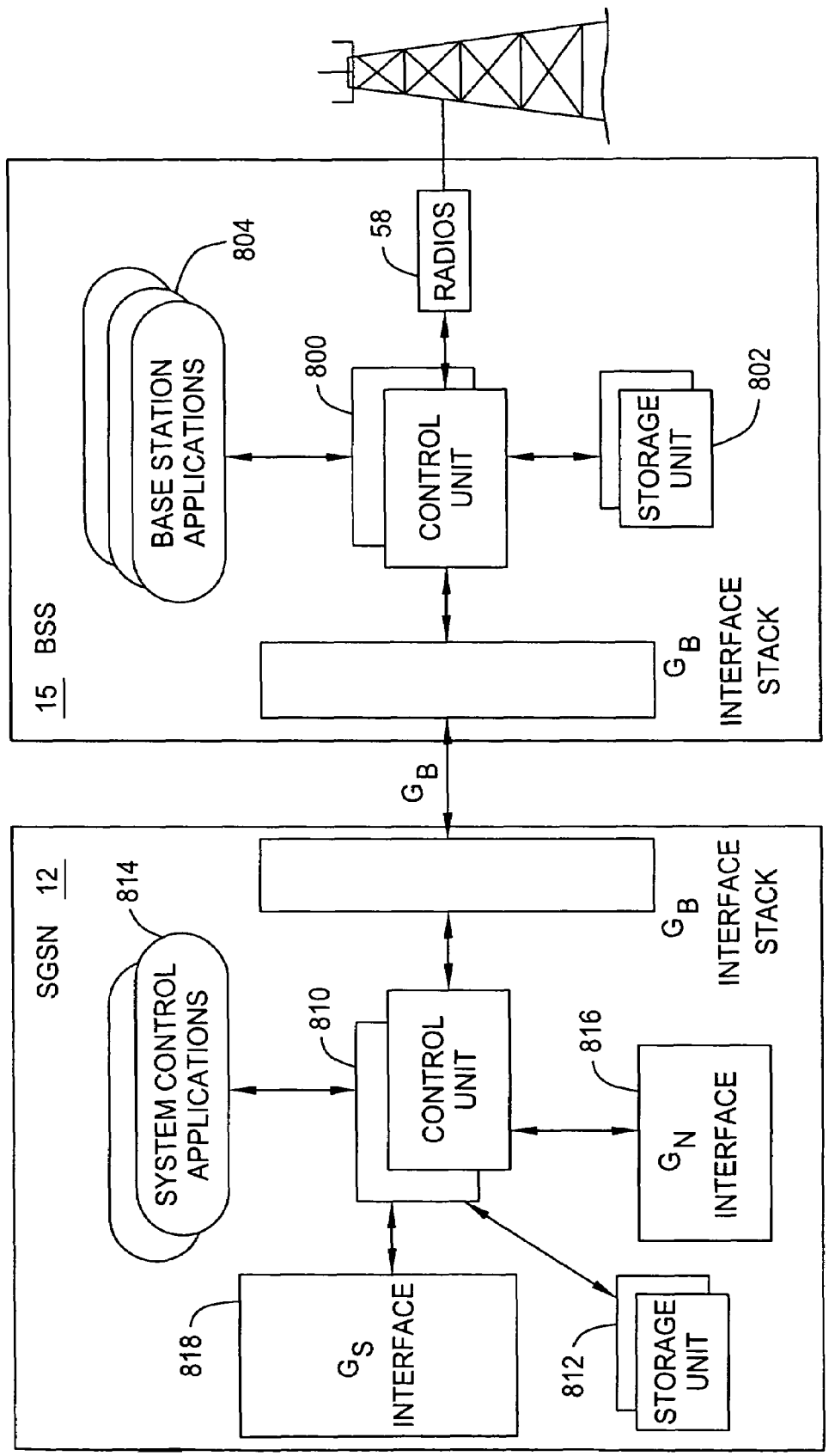
FIG. 19 is a block diagram of components of a BSS and an SGSN in the mobile communications system of FIG. 1.

Various tasks, functions, and operations that are performed by various nodes or systems in the mobile communications system 10 may be controlled by software applications, routines, or modules executable on control units in corresponding entities or nodes in the mobile communications system 10. For example, referring to FIG. 19, the BSS 15 includes one or more control units 800 and storage units 802. The BSS 15 also runs base station applications, routines, or modules 804 that control the BSS 15. Instructions of such software applications, routines or modules may be stored in the one or more storage units 802. Similarly, the SGSN 12 includes one or more control units 810 and one or more storage units 812. System control applications, routines, or modules 814 are executable on the control unit(s) 810. The SGSN 12 also contains a Gn interface 816 capable of communicating with the GGSN 18 (FIG. 1). A Gs interface 818 is capable of communicating with the G-MSC 22 (FIG. 1).

The control units may include a microprocessor, a microcontroller, a processor card (including one or more microprocessors or microcontrollers), or other control or computing devices. As used here, a "controller" refers to hardware, software, or a combination of the two.

The storage units may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact discs (CDs) or digital video discs (DVDs). Instructions that make up the various software applications, routines or modules in various network nodes or entities in respective storage units when executed by a respective control unit cause the corresponding node or entity to perform programmed acts.

The instructions of the software applications, routines or modules may be loaded or transported into the node or entity in one of many different ways. For example, code segments including instructions stored on floppy disks, CD or DVD media, a hard disk, or transported through a network interface card, modem, or other interface device may be loaded into the system and executed as corresponding software routines or programs. In the loading or transport process, data signals that are embodied as carrier waves (transmitted over telephone lines, network lines, wireless links, cables, and the like) may communicate the code segments, including instructions, to the network node or entity. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention

What is claimed is:

1. A serving GPRS support node (SGSN) for use in a mobile communications network having a plurality of cell sites, comprising:
 a connectionless, packet-based protocol layer to communicate, over a Gb interface, packets with a connectionless, packet-based protocol layer of a base station system in a cell site; and
 a controller adapted to transmit and receive data through the connectionless, packet-based protocol layer of the SGSN over the Gb interface with the base station system according to a connectionless, packet-based protocol.

2. The SGSN of claim 1, wherein the connectionless, packet-based protocol comprises an Internet Protocol.

3. The SGSN of claim 1, wherein the connectionless, packet-based protocol layer comprises a network layer, and the SGSN further comprises a transport layer to manage connections over the Gb interface.

4. The SGSN of claim 3, wherein the controller comprises a network services layer to transport packets through the transport and network layers.

5. A serving General Packet Radio Service (GPRS) support node for use in a mobile communications system having base station systems, comprising:
 an Internet Protocol (IP) layer to communicate over IP-based Gb interfaces coupled to the base station systems, the IP layer to manage communication over the Gb interfaces between the serving GPRS support node and the base station systems,
 wherein the IP layer is to communicate IP packets with IP layers in the base station systems.

6. The serving General Packet Radio Service support node of claim 5, further comprising a User Datagram Protocol transport component to manage connections over the Gb interfaces.

7. The serving General Packet Radio Service support node of claim 5, further comprising a network services layer to transport data units containing signaling and bearer traffic over the network.

8. A system for use in a mobile communications network having a plurality of cell sites, comprising:
 an Internet Protocol (IP) layer to communicate with a base station system in a cell site over a Gb interface;
 a controller adapted to transmit and receive data through the IP layer over the Gb interface with the base station system,
 wherein the IP layer is to manage communications of IP packets over the Gb interface; and
 a transport layer to manage connections over the Gb interface,
 wherein the controller comprises a network services layer to transport packets through the transport and IP layers.

9. The system of claim 8, wherein the transport layer comprises a User Datagram Protocol layer.

10. The system of claim 9, wherein the network services layer comprises a General Packet Radio Service network services layer.

11. A base station system for use in a mobile communications network having a system controller, the base station system comprising:
 one or more radio transceivers adapted to communicate with mobile stations; and
 a module coupled to the one or more radio transceivers and adapted to communicate through a Gb interface with the system controller according to a connectionless packet-based protocol.

12. The base station system of claim 11, wherein the connectionless, packet-based protocol comprises an Internet Protocol.

13. The base station system of claim 11, wherein the module is adapted to communicate data packets, each data packet containing addresses identifying the base station system and the system controller.

14. The base station system of claim 13, wherein each data packet contains Internet Protocol addresses.

15. A base station system for use in a mobile communications network having a system controller, the base station system comprising:
- one or more radio transceivers adapted to communicate with mobile stations;
- a module coupled to the one or more radio transceivers and adapted to communicate with the system controller; and
- an Internet Protocol layer to communicate over a Gb interface with the system controller according to an Internet Protocol.

16. A method of communicating in a mobile communications system having a base station system, a system controller, and a Gb interface between the base station system and the system controller, the method comprising:
- transmitting and receiving Internet Protocol (IP) data packets over the Gb interface between the base station system and system controller,
- wherein transmitting and receiving the IP data packets comprises an IP layer in the system controller transmitting and receiving the IP data packets over the Gb interface with an IP layer in the base station system.

* * * * *